3,347,844
WATER-INSOLUBLE INDOLINE MONOAZO
DYESTUFFS
Paul Rhyner and Visvanathan Ramanathan, Basel, Switzerland, assignors to Ciba Limited, Basel, Switzerland, a Swiss company
No Drawing. Filed June 25, 1964, Ser. No. 378,069
Claims priority, application Switzerland, July 10, 1963, 8,585/63
6 Claims. (Cl. 260—165)

ABSTRACT OF THE DISCLOSURE

Monoazo dyestuffs are obtained by coupling the diazo compound of an aromatic amine which contains a hydroxyl group, acyloxy group or alkoxy group in ortho-position to the amino group with a trialkyl-2-methylene-indoline. The azo dyestuffs are useful for dyeing hydrophobic fibers, particularly metal-containing polyolefinic fibers, and exhibit excellent fastness properties.

---

The present invention is based on the observation that valuable monoazo dyestuffs are obtained when the diazo compound of an aromatic amine, which contains a hydroxyl group, an acyloxy group or an alkoxy group in ortho-position to the amino group, is coupled with a compound of the formula

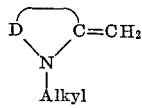

and if the dystuff thus obtained contains an acyloxy or an alkoxy group in ortho-position to the azo group, the acyloxy or alkoxy group is converted into a hydroxyl group.

It is advantageous to use diazo compounds of amines of the formula

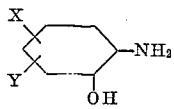

in which X and Y represent hydrogen or halogen atoms or alkyl, alkoxy, cyano or nitro groups.

As examples there may be mentioned the following amines:

1-amino-2-hydroxybenzene
1-amino-2-hydroxy-4-nitrobenzene
1-amino-2-benzoyloxybenzene
1-amino-2-para-toluene-sulfonyloxybenzene
1-amino-2-hydroxy-3-nitro-5-methylbenzene
1-amino-2-hydroxy-5-chlorobenzene
1-amino-2-hydroxy-4-chlorobenzene
1-amino-2-hydroxy-5-nitrobenzene
1-amino-2-hydroxy-4-nitro-5-chlorobenzene
1-amino-2-hydroxy-3:5-dichlorobenzene
1-amino-2-hydroxy-5-(tertiary)butylbenzene
1-amino-2-hydroxy-5-trifluoromethylbenzene
1-amino-2-hydroxy-5-nitro-4-chlorobenzene
1-amino-2-hydroxy-3-chloro-5-nitrobenzene
1-amino-2-hydroxy-5-bromobenzene
1-amino-2-hydroxy-3-nitro-5-chlorobenzene
1-amino-2-hydroxy-5-cyanobenzene
1-amino-2-hydroxy-3:5:6-trichlorobenzene
1-amino-2-hydroxy-5-methylbenzene and
1-amino-2-hydroxy-4-cyanonaphthalene.

The coupling components used are preferably trialkyl-2-methylene-indolines of the formula

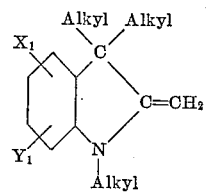

in which $X_1$ and $Y_1$ represent hydrogen or halogen atoms or alkyl, alkoxy, cyano or nitro groups, for example, 1:3:3-trimethyl-2-methylene-indoline
5-methoxy-1:3:3-trimethyl-2-methylene-indoline
5-ethoxy-1:3:3-trimethyl-2-methylene-indoline
5-cyano-1:3:3-trimethyl-2-methylene-indoline
1-ethyl-3:3-dimethyl-2-methylene-indoline
7-chloro-1:3:3-trimethyl-2-methylene-indoline
5-nitro-1:3:3-trimethyl-2-methylene-indoline
5-chloro-1:3:3-trimethyl-2-methylene-indoline
6-chloro-1:3:3-trimethyl-2-methylene-indoline
5-fluoro-1:3:3-trimethyl-2-methylene-indoline
1:3:3-triethyl-2-methylene-indoline
1:3:3-trimethyl-2-methylene-4:5 and 6:7-benzindoline and
1:3:3:5-tetramethyl-2-methylene-indoline.

The reaction of the diazo compounds with the hydrocyclic bases is advantageous carried out in an aqueous medium, preferably an acidic medium. It is generally of advantage to buffer excess mineral acid in the course of the reaction with a suitable buffer, for example, sodium acetate, sodium bicarbonate or pyridine. In some cases it can also be advantageous to carry out the reaction in an organic solvent, for example, in glacial acetic acid, pyridine, dimethyl formamide, benzene or acetone.

The water-insoluble dyestuffs obtainable by the process of the invention are new compounds and correspond to the formula

A—N=N—B in which A represents a radical that is joined to the azo group through a carbon atom, the said carbon atom being linked, either directly or through a further carbon atom, with a heterocyclic nitrogen atom, and B represents an aliphatic, a hydroaromatic, an aromatic or a heterocyclic radical which contains a hydroxyl group or an enolizable keto group in ortho-position to the azo group. The dyestuffs advantageously do not contain further hydroxyl groups in addition to the hydroxyl group in ortho-position to the azo group.

Of special interest are dyestuffs of the formula

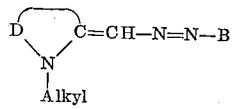

in which D represents the atomic grouping required to close a five membered or a six membered heterocyclic ring, and B represents a benzene radical that contains a hydroxyl group in ortho-position to the azo group, and especially those of the formula

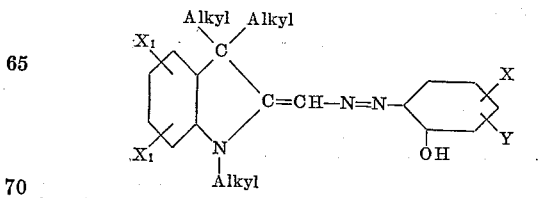

in which X, Y, $X_1$ and $Y_1$ represent hydrogen or halogen atoms or alkyl, alkoxy, cyano or nitro groups.

When the dyestuffs obtained contain an acyloxy or alkoxy group in ortho-position to the azo group, they are converted into ortho-hydroxy dyestuffs by a treatment with an acid or an alkali hydroxide.

The new dyestuffs are suitable for dyeing hydrophobic fibers, especially polyolefines containing metal, preferably nickel. Metal-modified polyolefines generally contain metal compounds in amounts of 0.05 to 2% as protection against ultra-violet irradiation, the said metal compounds being, for example, copper or zinc compounds, but preferably nickel salts, for example, nickel stearate, nickel acetate or nickel thiocarbamate.

In the dyeing process, the aforementioned dyestuffs are advantageously used in a state of fine division, and dyeing is carried out in the presence of a dispersing agent, for example, soap, sulfite cellulose waste liquor or a synthetic detergent, or in the presence of a combination of various wetting and dispersing agents. Prior to dyeing, it is generally of advantage to convert the dyestuff to be used into a dyeing preparation that contains a dispersing agent and finely divided dyestuff in a form such that a fine dispersion is formed when the said preparation is diluted with water. Such dyestuff preparations may be made in known manner, for example, by reprecipitating the dyestuff from sulfuric acid and grinding the suspension thus obtained together with sulfite cellulose waste liquor or, if necessary, by grinding the dyestuff in a highly efficient grinding device in the dry state or wet state in the presence or absence of a dispersing agent.

Dyeing is advantageously carried out in an aqueous dispersion at the boil and in the presence of a wetting agent. It has been found advantageous to render the dyebath slightly acid, for example, by the addition of a weak acid, for example, acetic acid. It must be assumed that, during the dyeing process, the dyestuff reacts with the metal compounds present in the fiber to form a metal complex.

In addition to application by the exhaustion process, the above-mentioned dyestuffs may also be applied in accordance with the process of the invention by padding and printing. In printing, for example, a printing paste is used that contains the finely divided dyestuff in addition to the usual printing assistants, for example, wetting agents and thickenings.

The process of the present invention yields strong, full dyeings and prints possessing excellent properties of fastness, to light, to dry cleaning, to sublimation during storage, and to rubbing. The dyestuffs exhibit exceptional tinctorial strength and ensure excellent preservation of wool.

The following examples illustrate the invention. Unless otherwise stated, the parts and percentages are by weight.

Example 1

5.4 parts of 1:3:3-trimethyl-2-methylene-indoline are dissolved in a mixture comprising 4.5 parts by volume of hydrochloric acid of 30% strength and 30 parts of water. A diazo suspension prepared in the customary manner from 4.6 parts of 5-nitro-2-aminophenol is then added gradually at 0 to 5° C. 20 parts of pyridine are added dropwise to complete coupling. After a number of hours, the dyestuff suspension is filtered and the filter residue is washed with water and dried. The dyestuff of the formula

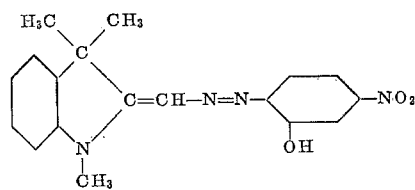

is obtained in the form of a dark red powder. It dyes nickel-containing polypropylene claret tints possessing a high degree of fastness to light and to dry cleaning.

In Column II of the following table there are listed a number of further dyestuffs that are obtained when the appropriate amino-hydroxy-benzenes or naphthalenes are coupled with the appropriate 1:3:3-trialkyl-2-trialkyl-2-methylene-indolines. In Column III there are listed the tints obtained with these dyestuffs on nickel-containing polypropylene; the dyeings possess a good fastness to light and to dry cleaning.

| No. | Dyestuff | Tint |
|---|---|---|
| 1 | OH–C₆H₃(NO₂)–N=N–CH=C(indoline with H₃C, CH₃ at C-3; N–CH₃) | Scarlet |
| 2 | O₂N–C₆H₂(OH)(CH₃)–N=N–CH=C(indoline; H₃C,CH₃; N–CH₃) | Claret |
| 3 | OH–C₆H₃(Cl)–N=N–CH=C(indoline; H₃C,CH₃; N–CH₃) | Scarlet |
| 4 | OH–C₆H₂(Cl)(Cl)–N=N–CH=C(indoline; H₃C,CH₃,Cl; N–CH₃) | Do. |
| 5 | O₂N–C₆H₂(OH)(Cl)–N=N–CH=C(indoline; H₃C,CH₃; N–CH₃) | Claret |
| 6 | OH–C₆H₃(CN)–N=N–CH=C(indoline; H₃C,CH₃; N–CH₃) | Red |
| 7 | O₂N–C₆H₂(OH)–N=N–CH=C(indoline; H₃C,CH₃; N–CH₃, Cl) | Claret |

| No. | Dyestuff | Tint |
|---|---|---|
| 8 | (structure with OH, Cl, N=N—CH=C, H₃C/CH₃, NO₂, N-CH₃) | Red. |
| 9 | (structure with OH, Cl, N=N—CH=C, H₃C/CH₃, OCH₃, N-CH₃) | Red. |
| 10 | (structure with OH, Cl, N=N—CH=C, H₃C/CH₃, Cl, N-CH₃) | Red brown. |
| 11 | (structure with OH, Br, N=N—CH=C, H₃C/CH₃, Cl, N-CH₃) | Scarlet. |
| 12 | (structure with OH, N=N—CH=C, H₃C/CH₃, N-CH₃) | Orange. |
| 13 | (structure with OH, Cl, N=N—CH=C, H₃C/CH₃, F, N-CH₃) | Scarlet. |
| 14 | (structure with OH, Cl, N=N—CH=C, H₃C/CH₃, Cl, N-CH₃) | Scarlet. |
| 15 | (structure with OH, NO₂, N=N—CH=C, H₃C/CH₃, N-CH₃) | Scarlet. |

| No. | Dyestuff | Tint |
|---|---|---|
| 16 | (structure with NC, OH, N=N—CH=C, H₃C/CH₃, N-CH₃) | Mauve. |
| 17 | (structure with OH, Cl, N=N—CH=C, C₂H₅/CH₃, N-C₂H₅) | Scarlet. |

*Example 2*

1 part of an aqueous paste of the dyestuff of the formula

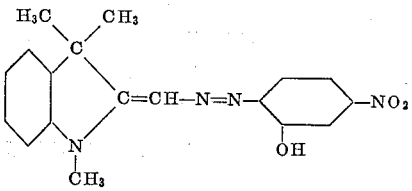

and approximately 1 part of dried sulfite cellulose waste liquor or some other suitable dispersing agent are ground to a fine paste in a roller mill, the paste thus obtained having a dyestuff content of 10%.

100 parts of nickel-containing polypropylene are washed for half an hour in a bath containing 1 to 2 parts of the sodium salt of N-benzyl-μ-heptadecylbenzimidazole disulfonic acid per 1000 parts of water. The material is then entered into a dyebath containing 10 parts of the dyestuff paste obtained as described in the preceding paragraph, 3 parts of the sodium salt of N-benzyl-μ-heptadecylbenzimidazole disulfonic acid and 1 part of acetic acid of 40% strength per 2000 parts of water. The dyebath is kept at the boil for 1 hour, whereupon the dyed material is rinsed and dried. A claret dyeing possessing a high degree of fastness to light and to dry cleaning is obtained.

*Example 3*

1 part of an aqueous paste of the dyestuff of the formula

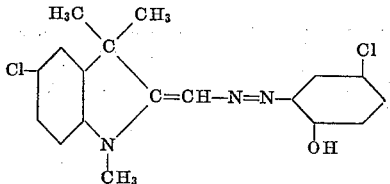

and approximately 1 part of 1:1'-dinaphthaylmethane-2:2'-disulfonic acid are ground to a fine paste in a roller mill, the paste thus obtained having a dyestuff content of 10%.

| | Parts |
|---|---|
| The paste thus obtained | 30 |
| Cold water | 380 |
| Urea | 50 |
| An aqueous sodium aglinate solution of 5% strength | 500 |
| and | |
| Ammonium sulfate | 40 |
| | 1000 | are then mixed by means of a high-speed stirrer. A nickel-containing polypropylene fabric is printed with the printing paste thus prepared. The printed fabric is dried, steamed for 30 minutes, rinsed in cold water for 10 minutes, centrifuged, and then treated for 10 minutes at 60° C. with a solution containing 2 grams of the condensation product of 9 mols of ethylene oxide and 1 mol of nonyl phenol per liter of water. A scarlet dyeing possessing very good properties of fastness is obtained.

*Example 4*

2-para-toluene-sulfonylhydroxyaniline is diazotised in the customary manner and the diazo compound thus obtained is added to a solution of 5-chloro-1:3:3-trimethyl-2-methylene-indoline in hydrochloric acid. Coupling is completed by the addition of sodium actate, 24 parts of the azo dyestuff so obtained are dissolved in 200 parts of alcohol, and then 90 parts of an aqueous solution containing 20 parts of sodium hydroxide are added. The solution is boiled under reflux. When the toluene sulfonyloxy group has been completely hydrolysed, the mixture is neutralized, the alcohol is distilled off, the dyestuff suspension is filtered and the filter residue is washed with water and dried. The dyestuff so obtained dyes nickel-containing polypropylene scarlet tints possessing a high degree of fastness to light and to dry cleaning.

*Example 5*

Diazotized ortho-anisidine is coupled with 5-chloro-1:3:3-trimethyl-2-methylene-indoline. 34 parts of the azo dyestuff thus obtained, 500 parts of hydrobromic acid of 63% strength and 100 parts of glacial acetic acid are heated to approximately 115° C. When the methoxy group has been completely demethylated, the mixture is neutralized, the dyestuff is isolated by filtration, washed with water and then dried. The dyestuff thus obtained is identical with the dyestuff obtained in the manner described in Example 4.

What is claimed is:
1. A water insoluble monoazo dyestuff of the formula

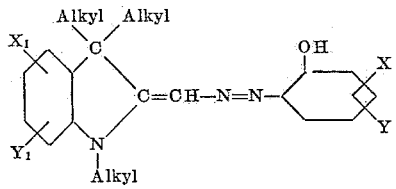

in which X, Y, X$_1$ and Y$_1$ each represents a member selected from the group consisting of hydrogen, halogen, lower alkyl, lower alkoxy, cyano and nitro and "Alkyl" represents lower alkyl.

2. The dyestuff of the formula

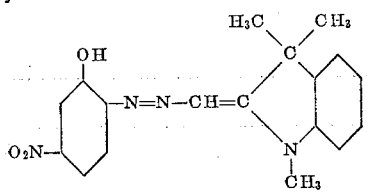

3. The dyestuff of the formula

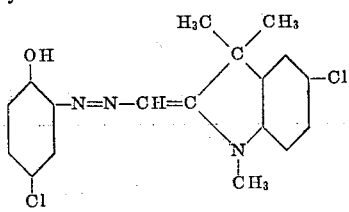

4. The dyestuff of the formula

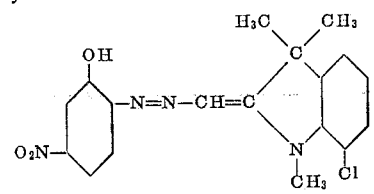

5. The dyestuff of the formula

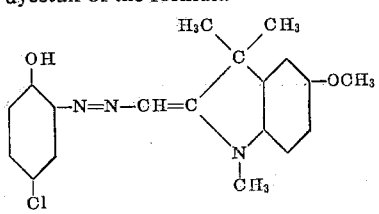

6. The dyestuff of the formula

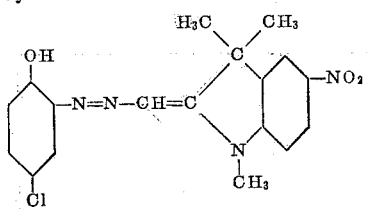

References Cited

UNITED STATES PATENTS 2,815,338   12/1957   Ruegg _____ 260—167 X

FOREIGN PATENTS 647,876   9/1962   Canada.

CHARLES B. PARKER, *Primary Examiner.*

D. M. PAPUGA, *Assistant Examiner.*